3,783,100
NON-RETROGRADED THINNED HYDROLYZATES
Roy F. Larson, Decatur, and Almerin W. Turner, Hampshire, Ill., assignors to A. E. Staley Manufacturing Company, Decatur, Ill.
Filed June 30, 1971, Ser. No. 158,475
Int. Cl. C12b 1/00
U.S. Cl. 195—31 R                29 Claims

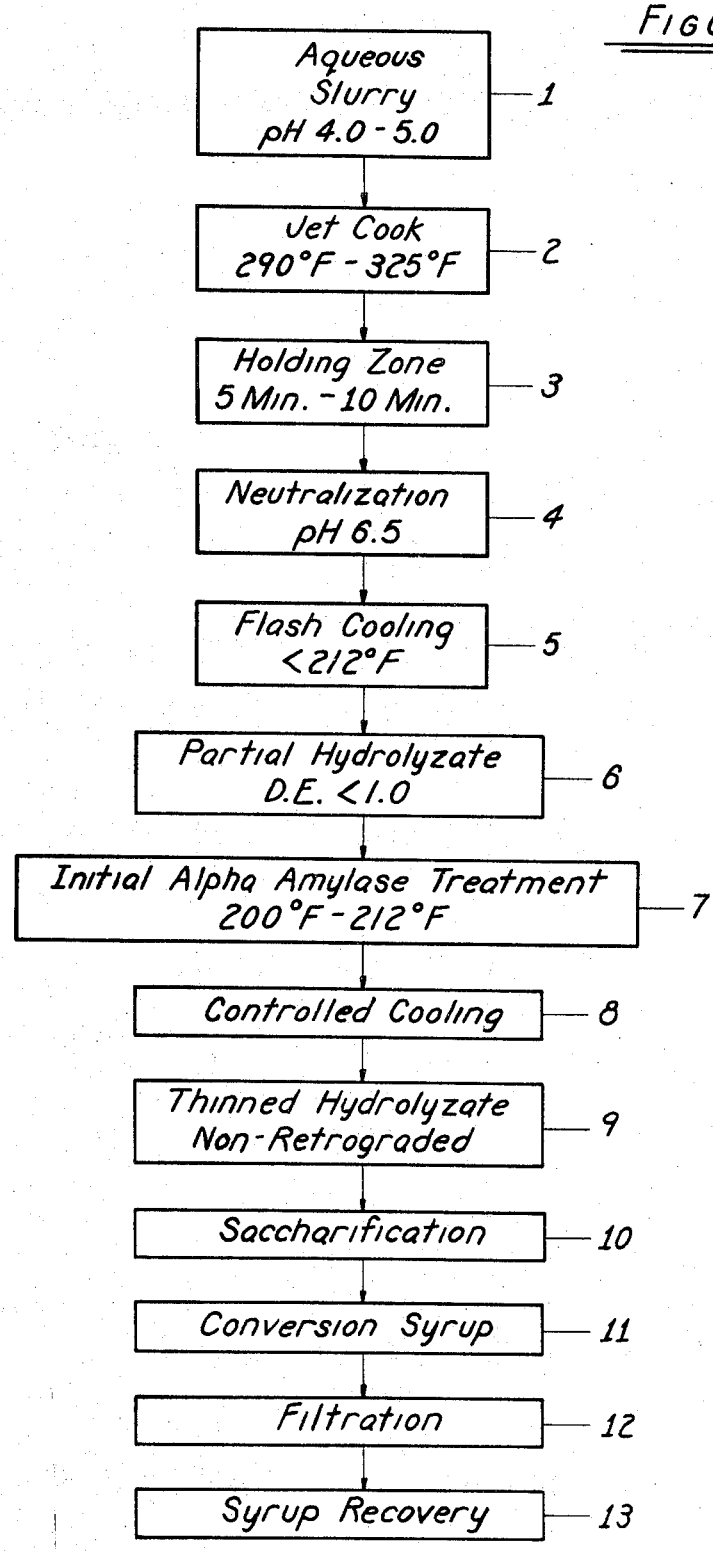
FIGURE I

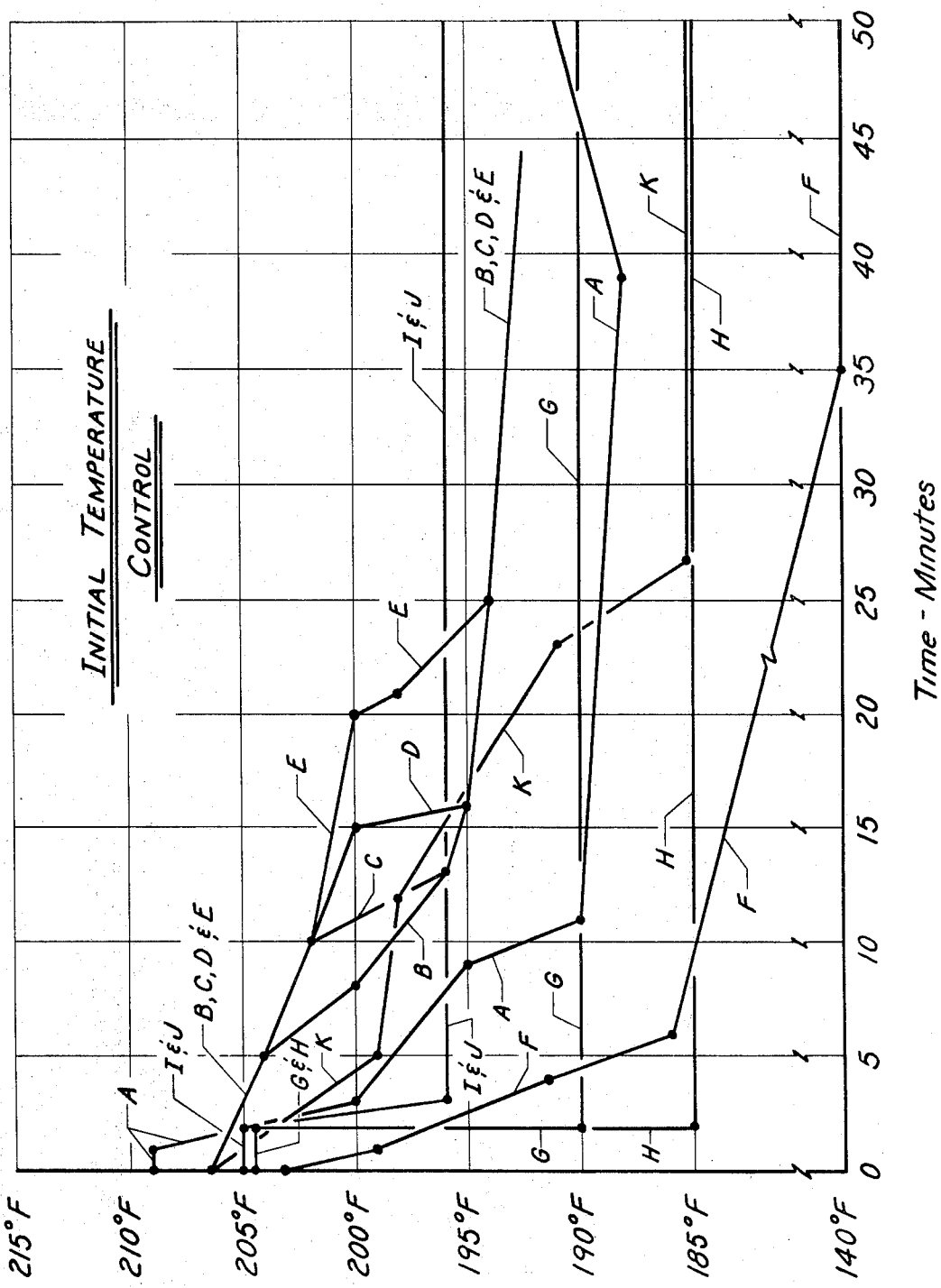

ABSTRACT OF THE DISCLOSURE

Thinned hydrolyzates are prepared by initially hydrolyzing a partial hydrolyzate of a D.E. less than 2.0 with alpha-amylase at 200° C.–212° F. and continuing the hydrolysis thereof at 185°–200° F. under non-retrograding process conditions. The alpha amylase requirements necessary to provide the thinned hydrolyzates are significantly reduced by the process. The resultant thinned hydrolyzates exhibit improved saccharification properties and rapid filtration characteristics.

BACKGROUND OF THE INVENTION

Prior to hydrolyzing an aqueous starch slurry to a conversion syrup with saccharifying enzyme, it is conventional to gelatinize and thin the starch slurry. Gelatinization and thinning of the starch slurry is normally achieved by heating the aqueous slurry to a temperature above the gelatinization temperature of the starch and partially hydrolyzing the solubilized starch with either an acid or α-amylase.

Under conventional acid-enzyme processing, an aqueous starch slurry is hydrolyzed and thinned at a pH of about 1.8 to about 2.5 under elevated temperatures and pressures to a D.E. of 15 to 20. The thinned starch (often referred to as a liquified starch) is then normally cooled to a temperature of about 60° C. and neutralized to a pH conducive to the activity of the saccharifying enzyme. An appropriate amount of saccharification enzyme is then added and the saccharification is allowed to proceed until the desired syrup conversion level is achieved. When it is desired to prepare a conversion syrup of a high sugar content, the saccharification is allowed to proceed to completion at which time the saccharification hydrolyzate is filtered and processed further. In the preparation of conversion syrups of a high dextrose content, the maximum conversion attainable by the acid-enzyme process is usually about 95–96 D.E.

Due to several inherent problems arising from the partial hydrolysis or thinning of aqueous starch slurries, the art has increasingly resorted to processing conditions wherein the partial hydrolysis and thinning steps are effectuated by an enzyme (i.e., an enzyme-enzyme process). The usual enzyme thinning procedure is accomplished by treating an aqueous starch slurry with an α-amylase at a pH of about 5.5–7.0 at about 80–90° C. for 1–3 hours. After the enzyme thinning, the hydrolyzate is cooled to the enzymatic saccharification temperature as in the acid-enzyme processes. Comparative to an acid-enzyme process, the enzyme-enzyme process results in higher recoverable yields of sugar conversion products and a reduction in certain undesirable by-products such as ash, 5-hydroxymethylofurfural (HMF) and color imparting agents.

Unfortunately, the conversion or saccharified sugars prepared from conventional enzyme-thinned hydrolyzates fail to filter at appreciable rates because of retrograded starch therein (e.g., often at only 1–2% by weight of the solids weight or less). In general, it has been experienced that enzyme thinned starch hydrolyzates inherently possess a character highly conducive to the formation of retrograded starch hydrolyzates (e.g., water-insoluble, microcrystalline particles which exhibit a β-type X-ray diffraction pattern). Moreover, a starch hydrolyzate containing retrograded starch cannot be hydrolyzed effectively and economically by enzymes.

Several means of avoiding starch retrogradation in the conversion syrup have been proposed by the art. In U.S. Pat. No. 3,378,462 by L. J. Denault et al., the patentees allege that the retrogradation problem is mitigated by conducting the alpha enzyme thinning in the presence of water-soluble calcium and sodium compounds at temperatures of about 185 to 195° F. British Pat. No. 1,157,515 by K. Kroyer proposes to obviate the degradation problem by employing an initial partial acid hydrolysis step wherein the starch slurry is hydrolyzed to a D.E. of not more than 10 (e.g., 5 minutes at 140° C. at a pH of 1.8–2.5). This partial acid hydrolyzate is then neutralized and rapidly cooled to an enzyme liquefication temperature and thinned.

Another suggested approach to obviate the degradation problem is to thin the starch with an enzyme after which the enzyme thinned hydrolyzate is subjected to boiling or autoclaving to resolubilize the insolubles therein. Saccharification is then completed by cooling the autoclaved or boiled hydrolyzate coupled with the addition of more enzyme to compensate for the thermally deactivated enzyme therein (e.g., see "Diastase 73" Tech. Bull. SP-254 (11/63), Rohm & Haas Company and Japanese Pat. No. 15,219 of 1964 by T. Iwazawa et al.). In U.S. Pat. No. 3,280,006 by T. L. Hurst et al., it is proposed that the retrogradation problem can be obviated by heating a partial hydrolyzate containing alpha-amylase to a temperature of 90°–100° C. to liquify substantially all of the starch followed by a thermal treatment in excess of 125° C. under pressure and subsequent saccharification thereof with amyloglucosidase. Canadian Pat. No. 753,228 by A. L. Wilson proposes another means of obviating the degradation problem. Pursuant to the Canadian patent teachings, a starch slurry is pasted in a jet cooker at temperatures of 130°–160° F. Retrogradation of the pasted starch is allegedly prevented in the Canadian patent by diluting the pasted starch with a thinned and partially saccharified starch hydrolyzate. Pursuant to the Canadian patent, it is advantageous to rapidly cool the pasted starch prior to the dilution thereof, although the dilution step may be employed as a means of rapidly cooling the pasted starch. A still further suggested approach to avoid the degradation problem is disclosed in copending application S.N. 627,329, now U.S. Pat. 3,551,293 by M. Seidman et al., filed on Mar. 31, 1967, and entitled, "method for Enzymatically Hydrolyzing Starch." In this copending application, it is proposed to paste and thin a starch slurry containing an enzyme by continuously heating the slurry to a temperature of 205–230° F. for a period of time sufficient to paste and thin the slurry without substantially deactivating the enzyme. The heated slurry containing the remaining viable enzyme is then immediately and continuously cooled and further thinner to the desired viscosity with the enzyme at a temperature of 170°–195° F.

Although the art has placed considerable amount of time, effort and money to prevent the starch degradation problem (as evidenced by the above art), there still exists a need to prevent starch retrogradation in an efficient and economical manner. The major thrust of the art to overcome the degradation problem by enzyme thinning and the enzyme saccharification route is to thermally solubilize the retrograded starch of partially thinned hydrolyzate followed by a supplemental addition of alpha-amylase to compensate for the thermally deactivated enzyme and thereby complete the thinning step. The saccharified product exhibits a low rate of filtration while requiring increased amounts of alpha amylase. Both the equipment requirements and total processing costs are increased thereby. The alternative suggestions, not necessitating excessive enzyme usage, are generally unsuitable and unattractive for various reasons such as requiring costly auxiliary equipment, inefficient in processing and recoverable yields and/or the formation of undesirable by-products and the like.

OBJECTS

It is an object of the present invention to provide an improved method for thinning starch with alpha amylase under conditions wherein the amount of insolubles and insoluble precursors are maintained at a minimum or negligible level.

A further object of the present invention is to optimize the enzymatic activity of alpha amylase in hydrolyzing starch containing materials.

A still further object of the invention is to reduce the enzyme requirements for thinning and saccharifying starch bearing substances.

Another object of the invention is to provide a method for preparing a conversion syrup possessing a rapid rate of filterability.

An additional object is to provide high D.E. conversion syrups which are readily filterable and recoverable.

Another object of the present invention is to reduce the processing time necessary to prepare thinned hydrolyzates.

A further object is to provide a more efficient and integrated process for thinning and saccharifying hydrolyzates without necessitating a substantial departure from conventional processing conditions and equipment requirements.

DRAWINGS

FIG. 1 is a schematic flow sheet depicting a suitable means for preparing the thinned hydrolyzate and also includes the preparation and recovery of the conversion products therefrom.

FIG. 2 represents the period of time and temperature conditions immediately following initial treatment of partial hydrolyzates with alpha-amylase as depicted by the temperature-time curves thereof.

DESCRIPTION OF THE INVENTION

According to the present invention, there is provided an improved method of enzymatically thinning starch hydrolyzates under decreasing temperatures and processing conditions sufficient to provide an essentially non-retrograded thinned hydrolyzate, said method comprising the steps of:

(a) Partially hydrolyzing an aqueous starch slurry maintained at a pH of about 3.6 to 6.5 by heating the slurry under superatmospheric conditions to a temperature of at least 250° F. for a period of time and under conditions sufficient to provide a partial starch hydrolyzate characterized as essentially free from insoluble starch granules and a D.E. of less than 2.0, (b) Further hydrolyzing the partial starch hydrolyzate by initially treating the partial hydrolyzate with an effective amount of alpha amylase and allowing the hydrolysis thereof to proceed while maintaining the hydrolyzate at a temperature of at least 200° F., and (c) Preparing a thinned hydrolyzate by cooling the hydrolyzate to a temperature within the range of at least 185° F. to less than 200° F. and allowing the alpha-amylase to continue to hydrolyze the hydrolyzate to a D.E. value of greater than about 5.

Saccharified or conversion sugars prepared from the thinned hydrolyzate herein exhibit significantly improved filtration rates over those sugars prepared from conventional enzyme-thinned hydrolyzates. The significantly improved filtration rates are obtained because the thinning method of the present invention provides a thinned hydrolyzate wherein the amount of retrograded starch during the thinning and subsequent saccharification thereof is maintained at a nominal and/or essentially free, non-retrograded level. As a result, conversion syrups prepared from the thinned hydrolyzates are essentially free from retrograded starch. The present invention optimizes both the effectiveness of the alpha-amylase during the thinning of the starch containing materials as well as the enzyme preparation employed in saccharifying the thinned hydrolyzates. Accordingly, enzyme requirements for both the thinning and subsequent saccharification can be substantially reduced by the present invention. The thinned hydrolyzates herein are easily obtained from aqueous starch slurries of a high solids content (e.g., 25% to about 40% by weight solids) without necessitating further processing. Thus, thinned hydrolyzates of a high solids content can be directly submitted to enzymatic saccharification to provide a conversion syrup of a high sugar content. Since the thinned hydrolyzates of high solids content may be directly submitted to the enzymatic saccharification, the thinned hydrolyzates (as well as the saccharified sugars therefrom) avoid the need of costly evaporative processing and/or costly auxiliary processing equipment.

The thinned hydrolyzates prepared in accordance with the invention provide a saccharified product of improved quality and yields. The overall total processing costs are competitive with conventional acid thinning processes while avoiding the filtration and retrogradation problems which have heretofore plagued previous enzyme thinning processes. The desired composition and characteristics of the resultant conversion syrup are more easily controlled by the thinned hydrolyzates of the present invention. Unlike the acid-enzyme processes, the method of the present invention provides a means for obtaining high recoverable yields of sugar conversion products without concomitant undesirable by-products such as HMF, ash, color imparting agents and the like. The thinned hydrolyzates prepared in accordance with the present invention are adapted for use in preparing a wide spectrum of sugar conversion products. Sugar conversion products, essentially free from retrograded starch, of a predetermined composition and sugar content are readily obtainable by employing the appropriate saccharification enzyme and conditions necessary to provide the desired resultant conversion syrup. As desired, the thinned hydrolyzates can be employed for preparing a variety of conversion sugar products such as high maltose sugars and syrups, high and low D.E. syrups, high and low dextrose syrups, and the like, as well as intermediate conversion products thereof.

PARTIAL HYDROLYZATE PREPARATION

In preparing the thinned hydrolyzates of the present invention, there is first provided a partial hydrolyzate characterized as having a D.E. of less than 2.0 and essentially free from insoluble starch granules. An aqueous starch slurry prepared by conventional means having an appropriate pH, starch solids content and uniformity is a suitable starting material in preparing the thinned hydrolyzates herein. The starch concentration of the starting aqueous slurry may vary over a relatively wide range (e.g., 5% to about 50). To minimize evaporative costs, overall equipment investment and operating expenditures in providing saccharified sugar products, the starting starch slurries employed in the present invention generally contain a starch solids content of at least 25% by weight and preferably about 30% to about 40% by weight starch. Aqueous starch slurries of a higher concentration (e.g., more than 40% may be utilized but are more difficult to process continuously. Unlike the thinned hydrolyzates prepared by acid thinning techniques, the pH of the aqueous slurry employed in preparing the partial hydrolyzate is maintained within the range of about 3.6 to about 6.5. The viscosity of the resultant partial hydrolyzates prepared herein are normally less than about 3,000 cps. but greater than about 200 with improved results being achieved when its viscosity is less than about 1,500 cps.[1]

The thinning method of the present invention is suitable in preparing thinned hydrolyzates from a variety of starch containing materials. The starch containing materials may be derived from a variety of sources including substantially pure starches and crude starch containing materials. Thus, purified and crude starches from corn, wheat, potatoes, sago, milo, sweet potato, tapioca, sorghum, rice, bean, oats, arrow root, barley, mixture thereof and the like may be utilized as starch containing materials. Likewise, various fractions from both wet and dry milling processes such as starch liquors, ground whole corn, corn flours, brewer's grits, air classified wheat starch products, wet cereal milling fractions such as centrifuged streams, clarified under flows and degermed mill stream slurries may be used. The invention is particularly useful in providing thinned hydrolyzate prepared from essentially pure commercial preparation of unmodified granular starches (e.g., unmodified cornstarch granules).

The present invention provides a means for obtaining a partial hydrolyzate from native starches without necessitating the use of alkali and alkaline earth metals. The ability to provide a partial hydrolyzate free from alkali and alkaline earth metals is advantageous since such ash contaminants are subsequently removed from the syrup (e.g., normally by ion exchange resin) prior to its sale. Aqueous slurries of native starches, substantially free from non-indigenous additives (e.g., aqueous starch slurries containing less than 0.003 mole of added alkali metal and alkaline earth metal substances such as the acetates, hypophosphates, lactates, chlorides, hydroxides, bicarbonates, carbonates, citrates of calcium and sodium), may be used. Advantageously, the amount of alkaline earth and alkali metals of the aqueous slurries utilized herein is less than 0.002 mole and preferably less than about 0.0015 mole.

A preliminary step in preparing the thinned hydrolyzates of the present invention is to subject an aqueous starch slurry having a pH of about 3.6 to about 6.5 to a temperature of at least 250° F. under superatmospheric conditions for a period of time and under conditions sufficient to provide the partial hydrolyzate. Pressure, temperatures, pH and other processing conditions which either are too severe or too mild to provide a partial hydrolyzate of the above characteristics (e.g., inappropriate D.E. and contaminated with insoluble starch granules) result in a thinned hydrolyzate inherently susceptible to subsequent retrogradation. Significantly improved overall processing efficiency and ease (including saccharification and sugar recovery therefrom) are obtainable when the partial hydrolyzate has been thinned to a D.E. of less than 1.0 and its viscosity ranges from about 400 to less than about 1,000 cps. When the D.E. of the resultant partial hydrolyzate is less than 0.5 (usually about 0.05 to about 0.4), there are provided thinned hydrolyzates which possess significantly improved characteristics over those partial hydrolyzates of a higher D.E. value.

The appropriate temperature, pressure and period of treatment to provide the partial hydrolyzate herein are obtainable by treating the aqueous slurry under appropriate conditions in an apparatus commonly known to the art as steam injection heaters or jet cookers, wherein superatmospheric steam is injected and mixed with a water slurry of starch granules in a throat section of a jet. Upon contact with the injected steam, the starch granules are uniformly and instantaneously thermally treated under turbulent conditions whereupon the starch granules are gelatinized and solubilized. Illustrative steam injection heaters wherein the pressures, temperatures and feed rates can be regulated to provide the desired partial hydrolyzate are disclosed in U.S. Pats. 2,805,995; 3,197,337; 3,219,-483 and 3,133,836. More uniformly solubilized partial hydrolyzates are obtained by use of the steam injection heater in combination with a holding zone such as coiled tubing or a pressurized tank constructed to minimize liquid channelling. Other thinning apparatus (e.g., heat exchangers, homogenizer cookers, rotators, sizeometer cookers, kettle cookers, etc.) may be employed provided the treatment and processing conditions are adequately controlled and provide the partial hydrolyzates described herein.

The processing conditions necessary to provide the partial hydrolyzate herein will depend largely upon the solids content, the starch character and pH of the aqueous slurry as well as other factors such as the pressure, temperature and amount of turbulence employed in preparing the partial hydrolyzate. For steam injection heaters, it is generally desirable to operate under relatively high pressures (e.g., 55–100 p.s.i.) in conjunction with temperatures substantially above 250° F. at a pH of about 4.0–5.0 and at an aqueous slurry content of about 30 to about 40% dry substance. When the aqueous slurry has a relatively low solids content and a lower pH, the partial hydrolyzates are generally prepared under less severe process conditions than those slurries having a higher solids and pH level.

As evident from the aforementioned, the particular processing conditions necessary to provide a partial hydrolyzate will vary considerably. Accordingly, process conditions in one type of apparatus may vary from that of a different type of apparatus. Utilizing a steam injection heater and a holding zone, the partial hydrolyzates are suitably prepared under the following illustrative conditions:

(a) an aqueous slurry of a solid content of 25–40% by weight,
(b) a slurry pH of 3.6–6.5,
(c) steam injection heater operated at temperatures and pressures respectively ranging from about 290° F. to about 325° F., and from about 57 to 96 p.s.i. (absolute), and
(d) a retention time of about 1 to about 20 minutes at a temperature of at least 250° F. while maintaining the product under superatmospheric pressure conditions within the holding zone.

Greater processing control in preventing retrogradation and efficiency is accomplished when the aqueous slurry of a solids content of about 30 to about 40% by weight is submitted to the jet injection heater at a temperature ranging from about 310° F. to about 320° F., a steam pressure of about 77 to about 90 p.s.i. (absolute), the pH of the slurry ranges from about 4.0 to about 4.5 and the product is retained in the holding zone at a temperature in excess of 250° F. under superatmospheric pressure conditions for an additional 4 to 15 minutes (preferably about 6 to 10 minutes).

The partial hydroyzate properties are further enhanced when the treated starch is expelled from retention zone with excess steam through an orifice into an area of a substantially reduced pressure. A suitable means of accomplishing this effect is to expel the starch paste with excess steam through an orifice into a zone maintained at ambient pressures and temperatures and thereby flash cool the paste. The excess steam, high shear through an orifice coupled with the flash cooling of the paste (usually to about 200°–212° F.), effectively solubilizes the starch and preconditions the starch paste against subsequent retrogradation.

INITIAL ALPHA-AMYLASE TREATMENT

In the present invention, it is essential that a partial hydrolyzate of a D.E. of less than 2.0 be initially treated and hydrolyzed with alpha-amylase at a temperature of at least 200° F. Generally, it is undesirable to initially treat the partial hydrolyzate with alpha amylase at tempertures and under process conditions which substantially ---
[1] As determined in a "Brookfield" viscometer operated at 20 r.p.m. with a No. 1 spindle at 205° F. and a pH 7.0.

deactivate the enzyme. At elevated temperatures (e.g., about 230° F.), the initially treated partial hydrolyzate should be rapidly cooled to a lower temperature to prevent thermal deactivation of the enzyme. The initial pretreatment step with alpha-amylase at the elevated temperature provides a partial hydrolyzate wherein the alpha amylase can effectively further thin the hydrolyzate without retrogradation. Inappropriate process conditions, following the formation of the partial hydrolyzate but prior to initial treatment with alpha amylase, can sufficiently alter the partial hydrolyzate so that it fails to possess those properties necessary to inhibit and prevent retrogradation. Thus, after the formation of the desired partial hydrolyzate, but prior to the addition of alpha-amylase, process conditions should be maintained to preserve the character of the partial hydrolyzate.

An effective means of preserving the character of the partial hydrolyzate is to terminate or retard the hydrolysis prior to the initial treatment with alpha-amylase. Termination or retardation of the rate of hydrolysis can be effectively controlled by cooling the partial hydrolyzate to less than 212° F. and by adjusting the pH thereof within the range of 5.8 to 8.5. Cooling of the partial hydrolyzate can easily be effectuated by flashing the product to atmospheric pressure. The pH adjustment can be effectuated immediately prior or after cooling of the partial hydrolyzate to a temperature of less than 212° F. However, the most effective way to terminate or retard the hydrolysis is to effectuate the pH adjustment immediately prior to cooling while the partial hydrolyzate is maintained at a temperature in excess of 250° under superatmospheric pressures. Any neutralizing base which does not significantly inhibit the enzymatic activity of alpha-amylase (e.g., alkali and alkaline earth neutralization bases such as sodium hydroxide, the sodium and calcium carbonates and bicarbonates, calcium hydroxide, etc.) may be employed to adjust the pH within the appropriate range. If salts or alkalies other than calcium ions are used for pH adjustment, conventional amounts of calcium ions should be incorporated into the partial hydrolyzate to maintain maximum enzyme viability. The purpose of providing a partial hydrolyzate possessing the above-mentioned prerequisite properties is to achieve a substrate which can be effectively hydrolyzed by alpha amylase while maintaining its unique hydrolyzate character.

In order to provide the unique thinned hydrolyzates herein, it is necessary to further hydrolyze the partial hydrolyzate by initially treating the partial hydrolyzate with alpha-amylase (e.g., normally at least a major portion of the total alpha amylase thinning requirements) under pH conditions conducive to the hydrolyzation thereof while allowing the hydrolysis thereof to proceed at a temperature of at least 200° F. This initial treatment not only prevents subsequent retrogradation, but also provides a means of significantly reducing the total enzyme requirements. If, at this stage of processing, the partial hydrolyzates is merely cooled to conventional thinning temperatures (e.g., about 175° F to 190° F.) and thinned, the resultant thinned product will exhibit significant retrogradation and require excessive amounts of alpha amylase and/or conversion enzymes.

The period of time the partial hydrolyzate is initially treated with the alpha amylase above 200° F. will depend largely upon the temperature of the enzyme hydrolysis medium. In general, the retention time of initial alpha amylase treatment at 200–212° F. will range from about 0.5 minute up to about 25 minutes. A retention period in excess of 25 minutes may be employed during this initial alpha-amylase treatment step without retrograding the hydrolyzate provided an effective amount of the enzyme is present to complete the thinning of the starch. Thus, relatively high initial alpha-amylase hydrolyzation temperatures (e.g., 2 minutes at 209° F. or more, 4 minutes at 207° F. and/or 6 minutes at 205° F. or more) and an increase in alpha-amylase requirements may be employed without adversely affecting the filterability of the resultant product. Such excessive periods of initial treatment, however, will tend to deactivate the enzyme and increase the total amount of enzyme needed to provide the thinned hydrolyzate. At the upper temperature limit (e.g., at about 210°), a retention time of about 30 to 90 seconds will suffice whereas at about 201° F. from about 15 to about 25 minutes will normally be required. To conserve upon the amount of enzyme required to hydrolyze the partial hydrolyzate while still retaining the improved thinned hydrolyzate character, it is advantageous to conduct the hydrolysis at temperatures in excess of 206° F., 205° F. and 204° F., respectively, for no longer than 2, 6 and 10 minutes. The effects of controlled temperatures upon the saccharification properties of the thinned hydrolyzates are more fully disclosed in the examples.

The alpha-amylase with which the partial hydrolyzate is initially treated and further hydrolyzed within the temperature range of at least 200° F. to about 212° F. is most suitably an alpha-amylase exhibiting heat stability at the temperatures and periods of time necessary to provide the thinned hydrolyzates. In general, those alpha-amylase preparations which are thermostable and capable of retaining 75% of their starch-liquefying activity for one hour at temperatures from 170–190° F. under pH conditions optimum for the specific enzyme, may be used. Thermostable preparations from microorganisms such as bacterial (e.g., *Bacillus subtilis*), fungi (e.g., *Aspergillus oryzae*), higher plants (e.g., barley), and animal sources may be employed.

Although impure alpha-amylase preparations can be employed, purified enzyme preparations are advantageously employed because the thinning and subsequent saccharification and recovery thereof are more easily controllable. Illustrative alpha-amylase preparations include bacterial enzymes such as "Takamine HT–1000" and "Tenase" (Miles Laboratories), "Rhozyme H–39" (Rohm & Haas) and "Ban 120" (Novo Industri), and fungal alpha-amylase preparations such as "clarase" (Miles Laboratories). Since the thinning steps herein are conducted at high temperatures and for time periods conducive to enzyme inactivation, the minimum enzyme requirements are best achieved via utilizing bacterial alpha-amylase preparations.

The amount of enzyme with which the partial hydrolysate is initially treated can vary considerably. Since the preliminary processing steps prior to the initial enzyme treatment and subsequent thinning steps (hereafter more fully described) prevents retrogradation, the minimum amount of enzyme preparation needed to thin the hydrolysate is significantly less than that required under conventional enzyme thinning processes. If desired, enzymatic quantities of alpha-amylase in excess of that necessary to properly thin the hydrolysate can be employed without adversely affecting the filterability characteristics of the saccharified products prepared therefrom (e.g., may be desired to increase thinning rate). Comparative to conventional enzyme thinning processes, it has been found that the thinning method of the invention significantly reduces the alpha-amylase requirements (e.g., about 25% to about 50% or more).

As is well recognized by the art, enzyme requirements predicated upon enzyme weights are not an accurate means for basing the amount of enzyme needed. The amount of enzyme required is, therefore, best expressed in terms of enzyme activity units per gram of starch on a dry weight basis. One unit of alpha-amylase, as referred to herein, is defined as that amount which will liquefy 20 grams of commercial grade pearl corn starch in a 10% by weight aqueous starch suspension, d.s.b., at 75° C. and a pH of 6.3 in 15 minutes to a liquid hydrolysate of which a 50 ml. sample has a flow time of 40 seconds through a standardized 50 ml. pipette. For reference purposes, the approximate activities of representative bacterial alpha-amylase preparations for the standardized method are as follows:

Enzyme: Activity, units/gm. enzyme, d.s.
- Rhozyme H-39 (Rohm & Haas) _____ 650
- Ban 120 (Novo Industri) _____ 250
- Tenase (Miles Laboratories) _____ 275
- Takamine HT-1000 (Miles Laboratories) _____ 460

The amount of alpha amylase necessary to thin a starch hydrolysate depends primarily upon the amount of starch hydrolysate solids. A greater solids content necessitates a greater quantum of alpha amylase. In general, the alpha amylase requirements utilized in the initial pretreatment step and subsequent thinning thereof are those amounts effective and sufficient to provide an essentially non-retrograded thinned hydrolysate. Normally the total amount of alpha amylase necessary to provide thinned hydrolysate herein will be greater than about 5.0 units of alpha amylase per 100 grams of dry starch hydrolysate solids. If desired, excessive amounts of alpha amylase (e.g., 50 units or more) may be employed to increase the hydrolysation rate. Such excessive amounts are normaly undesirable because of increased enzyme costs and filtration problems resulting from enzymatic impurities such as proteinaceous material and the like. For most commercial processing of the thinned hydrolysates herein, the amount of alpha amylase necessary to provide the desired thinned hydrolysate will range from about 10 to about 40 units per 100 grams of starch hydrolysate solids with an amount ranging from about 15 to about 30 units being preferred. Significant reductions in the total alpha amylase requirements, processing efficiency and product improvements are achieved when at least a major portion of the alpha amylase requirements are initially added to the partial hydrolysate within the 200° F.–212° F. range. Further benefits are achieved when more than 75% of the total alpha amylase thinning requirements are incorporated into and initially treated with the partial hydrolysate and preferably substantially all (95% or more) of the alpha amylase requirements are added to partial hydrolysate at a temperature within the range of 200° F.–212° F.

HYDROLYSIS AFTER INITIAL ALPHA AMYLASE TREATMENT

After initial treatment of the partial hydrolyzate with alpha amylase within the 200-212° F. temperature range, the thinned hydrolyzate is prepared by cooling the hydrolyzate to a temperature within the range of at least 185° F. to less than 200° F. The alpha amylase is then allowed to further hydrolyze the hydrolyzate to a D.E. of about 5.0 or more. In order to prevent retrogradation and optimize the efficiency of hydrolyzing enzymes, completion of the enzyme thinning is most suitably accomplished by employing at least two incremental stages of decreasing thinning temperatures. A plurality of thinning tanks in series respectively maintained at a temperature progressively lower than the previous thinning tank will provide a means for incrementally decreasing the thinning temperatures. Temperatures ranging from about 190° F. to about 200° F. for a period of time of about 30 minutes to about 90 minutes will normally suffice for the intermediate stage. Completion of the thinning thereof may then be effectuated by employing thinning temperatures of 185° F. to about 195° F. for about one to six hours. The rate at which the hydrolyzate is thinned will depend upon the solids concentration of the hydrolyzate, time and thinning temperatures as well as the alpha amylase enzyme units employed. For example, a thinned hydrolyzate having a D.E. of about 7 to about 13 and essentially free from retrogradation can be obtained by thinning the hydrolyzate of a 32% solids content with 25 units of alpha amylase for about one hour at a temperature of about 196° F.±2° F. (i.e., in the intermediate thinning stage) followed by additional thinning at 190° F.±2° F. for about 1 to about 3 hours in the final stage.

As indicated above, the subsequent process conditions following the initial treatment with alpha-amylase (e.g., at the 200–212° F. range) will have a pronounced effect upon the resultant thinned hydrolyzate and saccharified products prepared therefrom. In general, it has been found that significant residue reductions in the conversion syrups prepared from the thinned hydrolyzates are achieved when the hydrolysis is allowed to continue at temperatures above 190° F. for a period of time of at least five minutes or more. By allowing the hydrolysis to continue at temperatures of at least 190° F. for 10 minutes or more (preferably 15 to 25 minutes), conversion syrups of less than 0.05% starch residues are obtainable herein. The rate at which the hydrolyzate is allowed to continue within the 185° F.–212° F. temperature range also has a pronounced effect upon the thinned hydrolyzate character. Rapid and substantial temperature decreases (e.g., 10° F. decrease in less than about one minute) tend to increase the conversion syrup residue content. By employing gradual or incremental temperature decreases after initiating the hydrolysis with alpha amylase within 200° F.–212° F. range, the resultant thinned hydrolyzates generally possess significantly enhanced saccharification properties over thinned hydrolyzates prepared under more severe temperature decreases. The incremental temperature decreases may be effectuated step-wise as mentioned above (e.g., batchwise with each batch having a progressively lower temperature) or by gradual and continuous lowering of the hydrolyzation temperature. Although average incremental temperature decreases of less than 2° F. per minute (e.g., during the first 10 minutes after initial alpha-amylase) will improve saccharification properties of the thinned hydrolyzates, average incremental temperature decreases (within the 190°–212° F. range) of about 0.5° F. per minute (preferably less than about 0.25° F. per minute) will further enhance the properties of the thinned hydrolyzates. By carefully programming the rate of temperature reduction in the 190°–212° F. range, the alpha amylase requirements can be minimized within the range of about 10 to 15 units per 100 grams of hydrolyzate dry solids.

SACCHARIFICATION OF THE THINNED HYDROLYZATES

Following thinning, the thinned hydrolyzate is then adjusted to optimum pH and temperature conditions for the enzyme saccharification to provide the desired conversion syrup. Depending upon the desired conversion syrup, the alpha amylase present in the thinned hydrolyzate may be inactivated or retained to facilitate and/or supplement the activity of the saccharification enzyme preparations. The thinned hydrolyzates prepared in accordance with the present invention are in a non-retrograded form and inherently prevent retrogradation under enzymatic saccharification conditions. Conversion syrups prepared from the thinned hydrolyzates herein exhibit a significantly improved rate of filterability in comparison to syrups which are prepared from conventional enzyme thinned hydrolyzates. Saccharification rates and yields are increased while the saccharification enzyme requirements are reduced by employing the thinned hyrolyzate herein.

Sugar conversion products essentially free from retrograded starch of a predetermined composition and sugar content ar readily obtainable from the thinned hydrolyzate employing the appropriate saccharification enzyme and conditions necessary to provide the desired products. Accordingly, conventional saccharification conditions and enzyme preparations may be utilized in providing conversion sugar products containing the desired composition of corn syrup constituents such as dextrose, dextrins, maltose, maltodextrin, high and low molecular weight polysaccharides.

The thinned hydrolyzates of the present invention are especially adapted for use as a substrate in providing dextrose conversion syrups. In preparing such dextrose conversion syrups, any glucoamylase preparations capable of saccharifying conventional thinned hydrolyzates to dextrose may be employed. Illustrative glycoamylase preparations (often referred to as amyloglycosidase) include those of the Aspergillus, Clostridium, Mucor, Rhizopus genera. Those glucoamylase preparations which have been refined or modified to alter the transglucosylase activity are particularly suitable for use when it is desired to provide a conversion syrup of a high dextrose content. Exemplary saccharification conditions and/or glucoamylase preparations which retard transglucosylase activity are disclosed in U.S. Pats. Nos. 2,881,115; 2,893,921; 3,012,944; 2,967,805; 2,970,086; 3,329,578; 3,197,338; 3,137,639; 3,067,108; 3,303,102; 3,047,471; 3,039,936; 2,967,804; etc. If desired, other enzymes such as amylo-1,6-glucosidase (e.g., R-enzymes, isoamylase, pullulanase, etc.) may be utilized to facilitate the conversion of the thinned hydrolyzates to dextrose.

The amount of glucoamylase used to saccharify the thinned hydrolyzate to dextrose is dependent upon many factors such as (1) potency of the enzyme preparation, (2) conditions of saccharification (e.g., temperature, solids content, pH, etc.), (3) desired conversion time and (4) enzyme and processing costs, etc. By employing conventional amounts of glucoamylase preparation, it has been found that the total conversion time necessary to provide the desired syrup is substantially reduced by utilizing the thinned hydrolyzates of this invention (e.g., about 20 to 30% reduction in conversion time). Similarly, a substantial reduction in saccharification enzyme requirements are realized by utilizing conventional saccharification conditions and conversion times in conjunction with a reduced dosage of glucoamylase. Depending upon the desired objective, conversion syrups having a dextrose content (on a dry solids weight basis) ranging from about 90% to 96% by weight are normally obtained by saccharifying the thinned hydrolyzate with about 500 to about 1000 units of the glucoamylase preparation per 100 grams of thinned hydrolyzate solids. For conversion syrups of a lower D.E. and/or dextrose content, lesser glucoamylase units and/or shorter conversion time may be employed.

Utilizing the desired glucoamylase preparation, the thinned hydrolyzate is adjusted to the optimum pH and temperature and the saccharification is allowed to proceed to completion. Illustrative saccharification temperature (depending upon the glucoamylase preparation) will range from about 120° F. to about 160° F. with the optimum temperature for most glucoamylase preparations being at about 130° F.–145° F. Likewise, conventional saccharifying pH's for the saccharifying enzyme (e.g., about 3.8 to about 5.0 but most generally from about 4.0 to 4.3) are employed. Under the appropriate conditions, the desired degree of saccharification can be achieved within a period of time of about 30–100 hours with a conversion time of about 60 to about 72 hours being advantageously used to complete the conversion thereof.

The thinned hydrolyzates of the invention are also suitable in providing conversion syrups of a predetermined and limited dextrose content with a relatively high fermentable sugar and/or oligosaccharide content. Specialty conversion syrups (such as disclosed in U.S. Pat. No. 3,137,639 by T. L. Hurst et al.) via an enzyme system comprised of diastase (e.g., beta-amylase with or without alpha amylase) and glucoamylase can be prepared from the thinned hydrolyzate. Similarly, conversion syrups having a higher maltose and/or oligosaccharide content with a limited dextrose content (e.g., less than 25% and preferably less than 10%) may be obtained from the thinned hydrolyzates with an enzyme preparation comprised of diastase (e.g., fungal alpha amylase and/or beta amylase) and amylo-1,6-glucosidase (e.g., R-enzyme, isoamylase, pullulanase, etc.). Likewise, corn syrups having a diversified composition of dextrin, malto-dextrin, higher and lower polysaccharides, maltose and dextrose with a D.E. of about 18–35 (e.g., alpha amylase to partially hydrolyze the partial hydrolyzate) may be prepared. Under commercial syrup processing conditions, the thinned hydrolyzates herein enable the conversion syrup producers to prepare a conversion syrup of a more uniform and consistent sugar composition in comparison to those syrups obtained from conventional thinned hydrolyzates.

The thinned hydrolyzate also enables the commercial syrup producers to prepare conversion syrups under milder processing conditions (e.g., with fungal alpha amylase and beta amylase) which exhibit optimum activity at lower pH's (4.5 to 5.0) compared to acid thinned syrups requiring pH's of 5.5 to 6.0 for maximum activity.

PARTITIONING OF INSOLUBLE PROTEINS FROM THINNED HYDROLYZATES

In conventional wet milling of cereal starch bearing substance, the hull and germ portions are normally first separated from the starch and proteinaceous constituents of the seeds. Essentially pure commercial starches are then obtained by separating the starch from the proteinaceous constituents. Unfortunately, the starch and proteinaceous material are difficult to separate from one another. To improve upon the efficiency of this separation, the mill stream is normally thickened (usually referred to as "mill stream thickening") prior to any attempt to separate the protein or gluten from the starch. A major portion of the starch and gluten is normally separated from the starch in the primary starch-gluten separation station. A commercially significant amount of the starch and gluten remains unseparated as a starch-gluten fraction after the primary separation thereof. Wet millers normally employ a plurality of separation steps, such as filtration, centrifugation, etc., to further fractionate these starch1gluten fractions. This plurality of separation steps result in numerous mill streams which contain starch as a principal constituent and varying amounts of soluble and/or insoluble proteinaceous material. A substantial amount of the recovered purified starch is conventionally utilized by most wet millers in preparing starch hydrolyzates and syrup conversion products. For wet millers, it would be economically advantageous to directly utilize the starch mill streams containing substantial amounts of insoluble protein or the high protein starch end products.

Pursuant to the thinning method of the present invention, there is provided a method of partitioning insoluble protein constituents from starch hydrolyzates. The partitioning of the insoluble protein from the thinned hydrolyzate suitably utilizes as a starting material starch-gluten compositions such as those mill streams which contain starch as a principal constituent and a substantial amount of insoluble proteinaceous material (e.g., from about 0.5 to about 20% by weight insoluble protein solids). This aspect of the present invention is applicable to crude starches which have been subjected to mill stream thickening as well as non-thickened mill streams.

Consistent with the teachings herein, the partitioning of insoluble proteins from thinned hydrolyzates comprises the steps of preparing the partial hydrolyzate, initially treating the partial hydrolyzate with alpha amylase at 200–212° F., further hydrolyzing the hydrolyzate to provide a thinned hydrolyzate and subsequently partitioning the insoluble protein from the hydrolyzed starch. Accordingly, there is first prepared a starch-gluten partial hydrolyzate wherein the starch portion thereof is characterized as essentially free from starch granules and a D.E. of less than 2.0. If the partial hydrolyzate contains a significant amount of water-soluble proteinaceous material (e.g., more than about 0.05% on a total dry starch-protein solids weight basis), the water soluble proteinaceous material will generally adversely affect subsequent refining steps necessary to provide the desired commercial conversion syrup. Those mill streams which contain from about 0.5% by weight water insoluble proteins (e.g., protein having a solubility of less than 0.05 gram in 100 ml. water at a pH 4.5 and 35° C.) to less than about 20% weight protein on a total dry solids weight basis are advantageously utilized as a source material. The pH conditions utilized pursuant to the present invention are generally those which maintain the proteinaceous material in an insoluble state. Greater processing ease and partitioning of the insoluble proteinaceous material is accomplished by maintaining the pH within the range of about 4.0 to about 5.0 (i.e., within the isoelectric range) prior to the initial treatment of the hydrolyzate with alpha amylase.

Within the 200–212° F. temperature range, the partial hydrolyzate is initially treated with alpha-amylase. The alpha amylase is then allowed to continue to hydrolyze the partial hydrolyzate in accordance with the present invention. At any time after the hydrolysis has progressed to a state wherein the hydrolyzate medium is essentially free from starch (e.g., via the standard iodine starch test) the insoluble proteinaceous material may be partioned from the starch hydrolyzate. Conventional partitioning methods and apparatus for separating insolubles from aqueous solution such as filtration, centrifugation, flotation and the like may be utilized in partitioning the water-insoluble proteinaceous material from the hydrolyzate.

The partitioning step may be conducted at any time after the hydrolyzate medium is essentially free from starch molecules. The particular stage in which the insoluble proteinaceous material is partitioned from the starch hydrolyzate will depend largely upon the most advantageous stage for its removal. Accordingly, if it is desired to provide a thinned hydrolyzate primarily comprised of relatively high polysaccharides and oligosaccharides, the partitioning step is normally conducted immediately after the desired hydrolyzate product is prepared. When it is desired to prepare a sugar conversion syrup, the partitioning may alternatively be effectuated after preparation of the desired thinned hydrolyzate or the saccharification thereof.

In general, the insoluble proteinaceous materials recovered by the present invention exhibit improved properties comparative to the proteins which are recovered conventionally. The recovered protein product possesses substantially the same chemical and physical characteristics as the insoluble protein initially submitted to the partitioning method. The method therefore provides a method of recovering the protein without altering and degrading its desired properties. The recovered insoluble protein is suitable for use as a high food grade protein.

Due to excellent filtration characteristics of the thinned hydrolyzates herein, the insoluble proteinaceous material is readily separated and washed from the thinned hydrolyzate by conventional filtration techniques without necessitating more than a one partitioning step. Recoverable yields of the insoluble protein are substantially identical to the insolubles of the mill stream.

SUMMARY

A summary of a preferred embodiment of practicing the present invention is represented by the schematic flow sheet of FIG. 1. In FIG. 1, an aqueous slurry of starch granules 1 is prepared and steam cooked 2 at a temperature in excess of 250° F. under superatmospheric pressure conditions (e.g., in a jet cooker). The cooked starch is then transferred to a holding zone 3 and further retained under elevated temperatures and pressures for a period of time sufficient to completely solubilize the starch and provide a product essentially free from starch granules. The hydrolyzation of the resultant starch is terminated and the solubilized state maintained, by neutralizing 4 the partial hydrolyzate with a base and flash cooling 5 the partial hydrolyzate to a temperature of 200–212° F. The resultant partial hydrolyzate 6 having a D.E. of less than 1.0, and essentially free from starch granules is then initially treated with alpha amylas 7 at a temperature of 200–212° F. After the initial alpha amylase treatment, the hydrolyzate is then gradually cooled 8 under conditions sufficient to provide a thinned hydrolyzate 9 essentially free from retrograded starch. The resultant thinned hydrolyzate 9 is then suitably subjected to appropriate saccharification conditions 10 whereby the desired conversion syrup 11 is obtained. The conversion syrup 11 is then filtered 12 and the conversion product 13 is recovered.

The following examples are merely illustrative and should not be construed as limiting the scope of the invention.

EXAMPLE 1

(A) Preparation of the partial hydrolyzate

An 18° Bé. aqueous slurry of unmodified corn starch at a pH of 4.2 was prepared. The slurry was pumped at a rate of 2.5 gallons per minute through a steam injection heater of the type disclosed in U.S. Pat. No. 3,101,284 operated at 317° F. under 75 p.s.i. steam (absolute). The resultant paste stream was retained, in a tail pipe connected to the steam heater, at about 317° F. and 75 p.s.i. for 8 minutes. Immediately prior to discharging the paste into a vacuum flash cooler, the paste was neutralized to a pH 6.5 with 3.1 M calcium hydroxide solution. The neutralized paste was then flash cooled to a temperature of about 210° F. Theh resultant partial hydrolyzate was essentially free from starch granules and retrograded starch. The viscosity of the hydrolyzate was 600 cps. as determined by "Brookfield" viscometer at 205° F. with a No. 1 spindle operated at 20 r.p.m. Pursuant to the copper number test,[2] the partial hydrolyzate was analyzed and found to have a D.E. of 0.4.

(B) PREPARATION OF THE THINNED HYDROLYZATE

The resultant partial hydrolyzate was initially treated with 25 units of alpha amylase per 100 grams of dry hydrolyzate solids at a temperature of 206° F. By gradually cooling the hydrolyzate under controlled conditions such that the hydrolyzate had cooled to a temperature of 202° F., 198° F., 191° F., and 185° F., respectively at 5, 12, 23, and 180 minutes after initial treatment with alpha amylase ("Ban 120" by Novo Industri); a thinned hydrolyzate characterized as having a D.E. of 9.0 (Analytical Method E-26 [3]) was obtained. The thinned hydrolyzate was substantially free from starch granules and retrograded starch as evidenced by a yellow color when a sample of the thinned hydrolyzate was tested via the iodine starch test of Standard Analytical Method E-60 [3].

(C) PREPARATION OF A DEXTROSE CONVERSON SYRUP

A conversion syrup of a high dextrose content was prepared from the thinned hydrolyzate. In preparing the conversion syrup, there was employed conventional dextrose conversion equipment with the syrup medium being maintained at a 4.0 pH and 60° C. After 72 hours of saccharification with 900 units of glucoamylase [4] per 100 grams of dry hydrolyzate solids, the saccharification thereof was terminated by carbon refining and filtration. The filterability of the conversion syrup was determined by adding a 400 cc. sample of the conversion syrup at about 170° F. to a Buchner funnel coated with a carbon layer (layer having been applied using 2.32 grams Darco S–51 carbon in 100 ml. cc. water on 9.0 cm. Whatman No. 2 filter paper) and connected to a water aspirator and measuring the time required for the indicated volume to collect in a calibrated receiving flask. Upon the basis of recovered filtrate for a given period of time, the filtration

---

[2] Industrial Engineering Chemistry, analytical edition, vol. 13, page 616 (1941), Farley & Hixon.
[3] Standard Analytical Method of the Member Companies of Corn Refiners Assoc., Inc., third edition, first revision 52768.
[4] Glucoamylase—75 (Novo Industri).

rate of conversion syrup was ascertained as being equivalent 25 gal./hr. per square foot of filter medium. The resultant conversion product was analyzed for "weight percent of insolubles" by precoating a Buchner funnel with 5.0 grams of "Hyflo" filter aid, filtering 250 cc. of the conversion syrup, washing the resultant cake with 50.0 cc. water, drying the washed cake in an oven at 140° F.–160° F., substracting the weight of Hyflo from dried filter cake weight obtained, and dividing this value by the dry weight of solids in another 250 cc. of the conversion syrup. The conversion syrup was also analyzed for "volume percent insolubles" by centrifuging at maximum speed on a Model 65828 H International laboratory centrifuge, a 15 cc. sample of the conversion syrup in a 15 cc. graduated centrifuge tube for 20 minutes.

The "weight percent of insolubles" test indicated 0.5% weight insoluble residue with the weight percent of insoluble starch therein being essentially zero. No detectable insolubles were observed by the "volume percent insolubles" test. Pursuant to analytical method E–26 [5], the D.E. value of the conversion syrup was 98. The percent dextrose solids was 96% as ascertained by analytical method E–24 [5].

EXAMPLE II

Processing conditions and character of the partial hydrolyzate as well as the thinned hydrolyzate are important factors in preparing a commercially attractive conversion syrup of a high dextrose content. In preparing the partial hydrolyzate and thinned hydrolyzate, this example illustrates the effect of processing variables upon the processing ease and character of dextrose conversion syrups obtained thereby. With reference to Runs A–K, and FIG. II, the process conditions employed in preparing the thinned hydrolyzates and dextrose conversion syrups therefrom are generally set forth in Table 1. The physical characteristics of aqueous slurry (i.e., solids content and pH), steam injection heater conditions, retention time in the holding zone at substantially the same pressure and temperature conditions as employed in the steam injection heater and pH adjustment with 3.0 molar calcium hydroxide immediately prior to flash cooling are set forth in the table under the general heading partial hydrolyzate. After neutralization, each of the runs was flash cooled and initially treated with alpha amylase.

In Runs A–K, the D.E. values for the partial hydrolyzate were less than 1.0. The partial hydrolyzate of Runs G and H respectively had D.E. values [6] of 0.7 and 0.5 with Runs I–K being less than about 0.5. The viscosities (cps.) for the partial hydrolyzate of Runs A, G, H, I, J and K were respectively 1,600, 200, 200, 330, 600 and 300.

The temperature at which Runs A–K were initially treated with alpha amylase is indicated in the table. Similarly, the units of alpha amylase employed are also indicated under the heading of initial alpha-amylase treatment. The time-temperature relationship during the initial fifty minutes of hydrolysis with alpha amylase for each of the runs is depicted by Curves A–K of FIG. II.

As shown in FIG. II, Curve A represents a partial hydrolyzate initially treated with alpha amylase at a temperature of 209° F. In Curve A, the hydrolysis thereof was maintained at 209° F. until one minute after initial treatment with alpha amylase. During the time interval of one minute to three minutes, the hydrolyzate medium was cooled to a temperature of 200° F. Between 3 minutes and 9 minutes (after initiating the hydrolysis thereof with alpha amylase), the hydroyzate medium represented by Curve A was further gradually cooled to a temperature of 195° F. The hydrolysis represented by Curve A was then gradually cooled from 195° to 190°. At about 11 minutes after initiating the hydrolysis with alpha amylase, the medium depicted by Curve A had obtained a temperature of 190° F. Thereafter, the hydrolyzate medium was continually cooled (11 minutes to 39 minutes) to 188° F. Between the time interval of 39 and 189 minutes, the alpha amylase hydrolyzate medium was maintained at a temperature of about 191° F.±3° F., whereupon the hydrolyzate was adjusted to a pH 4.0 and cooled to 60° C. The D.E. of the resultant cooled thinned hydrolyzate was 9.0 A conversion syrup of a high dextrose content was then prepared from thinned hydrolyzate of Run A.

With reference to FIG. II, the partial hydrolyzates of Curves B, C, D and E were initially treated with alpha-amylase at a temperature of about 206.5° C. and cooled gradually to a temperature of 204° C. over a five minute time interval. The hydrolyzate represented by Curve B was gradually cooled to 200° C. (8 minutes after initial treatment with alpha amylase). The temperature and time coordinates fro Curves C, D and E coincide with one another to the 10 minute time interval with each hydrolyzate represented therein being gradually cooled to a temperature of 202° F. The hydrolyzate of Curve C was gradually cooled from 202° F. to 196° F. between the time interval of 10 to 13 minutes. After the 10 minute time interval, the hydrolyzate of Curves D and E were respectively cooled at slower rates as indicated by FIG. II. The temperature coordinates for Curves B and C; B, C and D and B, C, D and E, respectively, correspond to one another at 13, 16 and 25 minutes.

Curve F represents a partial hydrolyzate which was initially treated with high alpha-amylase dosage (43 units) at a temperature of 203° F. and cooled in 45 seconds to less than 200° F. and further gradually cooled from 200° F. to 140° F. over a 45-minute interval whereupon the thinned hydrolyzate was saccharified under conversion conditions substantially identical as in Run A. The hydrolyzation medium represented by Curves G and H were initially treated with alpha amylase at 203° F. and maintained at 203° F. for 2 minutes. Thereafter the hydrolyzates of Curves G and H were rapidly cooled to temperatures respectively of 190° F. and 185° F. and maintained at their respective temperatures until completion of the thinning thereof. The alpha amylase temperature curves for Runs I and J coincide with one another during the first fifty minutes of hydrolysis.

The curves represented in FIG. II depict the first fifty minutes of treatment of Runs A–K. The desired thinned hydrolyzates were obtained by further hydrolyzing the hydrolyzate medium with the alpha amylase. In Runs H and K, the first stage of thinning (i.e., after 50 minutes) was conducted at 185° F. for an additional time of about 180 minutes (i.e., 230 minutes after the initial treatment with alpha amylase). The later stages employed in preparing the remaining hydrolyzates are as follows:

| Run | Temperatures, ° F. | Period of hydrolysis after 50 minutes |
| --- | --- | --- |
| B | 190 | 50–150 minutes. |
| C | 190 | 50–132 minutes. |
| D | 190 | Do. |
| E | 190 | 50–120 minutes. |
| G | 190 | 50–180 minutes. |
| I | 196 | 50–60 minutes. |
|   | 190 | 60–120 minutes. |
| J | 196 | 50–60 minutes. |
|   | 190 | 60–120 minutes. |
| K | 189 | 60–180 minutes. |

The D.E. values for the resultant thinned hydrolyzates for Runs A–K are set forth in the table.

The thinned hydrolyzate of Runs A–K were then adjusted to a 4.0 pH and cooled to a temperature of 60° C. Dextrose conversion syrups were obtained by saccharification of the thinned hydrolyzates with glucoamylase. In

---

[5] Standard Analytical Method of the Member Companies of Corn Refiners Assoc., Inc., third edition, first revision 52768.
[6] Copper Test—Industrial Engineering Chemistry, analytical edition, vol. 13, page 616 (1941), Farley & Hixon.

Runs A, F, G, H, I, J and K, a 72-hour conversion time was employed whereas runs B, C, D and E the saccharifications was terminated after 66 hours. For each of the runs, 900 units glucomaylase per 100 grams of thinned hydrolyzate solids was employed. After completing the saccharification, the resultant conversion syrups were analyzed with the D.E., dextrose content and amount of insolubles (either by the "volume percent insolubes or weight percent insolubles") being represented in the Table.

starch granules. The residue volume percent and weight percent values in the above table indicates a substantial absence of insolubles. When subjected to the standard iodine test, samples of the thinned hydrolyzates and conversion syrups of Runs A-D, F and I-K gave a negative test (i.e., the samples were yellow and free from blue, red and/or brownish color of starch containing substances). Upon submission to the iodine test, the thinned hydrolyzate and conversion syrups of Runs G and H pos-

TABLE

| Run | Partial hydrolyzate | | | | | | | | Thinned hydrolyzate. D.E.[6] | Conversion syrup properties | | | |
|---|---|---|---|---|---|---|---|---|---|---|---|---|---|
| | Starch slurry[1] | | Jet cooker | | Holding zone,[2] minutes | Neutralization,[3] pH | Initial treatment, α-Amylase | | | D.E.[6] | D[7] Percent | Starch residue, volume percent[8] | Residue, weight percent[8] |
| | pH | Bé | Temp. | P.s.i. | | | Temp.[4] | Units[5] | | | | | |
| A | 4.0 | 18 | 315 | 71 | 8.0 | 7.0 | 209 | 25 | 8.6 | 97.0 | 95.6 | Trace | |
| B | 4.0 | 17 | 306 | 56 | 20.0 | 5.9 | 210 | 15 | 5.9 | 97.8 | 95.5 | Trace | |
| C | 4.0 | 17 | 306 | 56 | 20.0 | 5.9 | 210 | 15 | 5.6 | 98.0 | 96.0 | Trace | |
| D | 4.0 | 17 | 306 | 56 | 20.0 | 5.9 | 210 | 15 | 5.0 | 96.5 | 95.6 | Trace | |
| E | 4.0 | 17 | 306 | 56 | 20.0 | 5.9 | 210 | 15 | 4.6 | 97.4 | 95.6 | 0.04 | |
| F | 3.6 | 17 | 306 | 56 | 20.0 | 6.0 | 203 | 43 | 10.0 | 97.2 | 95.5 | | |
| G | 4.0 | 18 | 315 | 71 | 8.0 | 7.0 | 203 | 25 | 15.2 | 97.9 | 95.6 | | 1.2 |
| H | 4.0 | 18 | 315 | 71 | 8.0 | 7.0 | 203 | 25 | 17.6 | 96.5 | 94.5 | | 1.7 |
| I | 4.0 | 18 | 312 | 67 | 8.0 | 7.0 | 205 | 25 | 16.0 | 97.0 | 95.0 | | 0.3 |
| J | 4.2 | 18 | 317 | 75 | 8.0 | 7.0 | 205 | 25 | 12.0 | 97.6 | 94.8 | Trace | |
| K | 4.0 | 18 | 312 | 67 | 6.5 | | 206 | 15 | 12.0 | 97.3 | 96.6 | Trace | |

[1] Immediately prior to jet cooking.
[2] Retention time in the tail pipe zone at substantially the same pressure and temperature as the jet cooker.
[3] With 3.0 molar calcium hydroxide.
[4] Initial treatment with alpha amylase.
[5] Units of alpha amylase on the basis of 100 gram starch hydrolyzate solids.
[6] Analytical method E-26, standard analytical method of the member companies of Corn Refiners Assoc., Inc. third ed. first rev. 52768.
[7] Analytical method E-24, standard analytical method of the member companies of Corn Refiners Assoc., Inc. third ed. first rev. 52768.
[8] Per example 1C above.

It should be noted that the weight percent and volume percent values represented in the above table are not identical in composition. The weight percent values represent all of the insoluble materials in the conversion syrup. Accordingly, the weight percent value of the tables include not only the insoluble carbohydrates (e.g., the higher molecular weight polysaccharides such as retrograded and granular starches) but also insoluble lipid materials and proteinaceous materials (if present). Further analysis of the weight percent values for the conversion syrups of Runs G and H indicated respectively polysaccharides of a higher molecular weight content of about 0.7 and 1.2. Runs G and H gave a positive starch test when subjected to the standard iodine test. In contrast, the conversion syrup of Run I was comprised primarily of lipid material and provided a characteristic yellow color when subjected to the standard iodine test.

The tabulated "volume percent" values more accurately reflect the high molecular weight saccharides content of the conversion syrups. If the conversion syrup contains insoluble proteinaceous material, the protein will also settle with the insoluble saccharide material in the centrifuge test tube. Since the starch slurries employed in Runs A-K were free from proteinaceous material (except in trace amounts), the volume percent values represented in the table were not distorted by the presence of such proteinaceous material.

For Runs G, H, I and J, the filterability of resultant conversion syrups was determined with a conventional filter plate and frame press and found to be respectively, 4.7, 3.0, 25.0 and 32.0 gallons a minute per square foot of filter medium when filtering approximately from 10 to 40 gallons filtrate through per square foot of filter medium. The filtration rates of Runs F and K were determined by the filtration method of Example 1 and were at least comparable to that of Run I. Runs A, B, C and D also possessed a fast rate of filtration (e.g., greater than 25 gallons per minute). Although the conversion syrups of Runs G and H possessed a relatively high D.E. and dextrose content, these conversion syrups were difficult to filter as respectively evidenced by filterability of 4.7 and 3.0 gallons a minute per square foot of filter medium.

The thinned hydrolyzates of Runs A-D, F and I-K (as well as the conversion syrups prepared therefrom) were substantially free from retrograded starch and insoluble sessed a characteristic blue color indicating the presence of either retrograded and/or insoluble starch therein.

The primary reason for the presence of retrograded starch and insoluble starch in the thinned hydrolyzates and conversion syrups of Runs G and H was due to the process conditions employed in preparing the thinned hydrolyzate. A comparison of the temperature-time curves of FIG. II shows that the thinned hydrolyzates of Runs G and H were initially treated with alpha amylase for two minutes at 203° F. followed by a rapid cooling and further hydrolysis respectively of 190° F. and 185° F. In contrast to Runs G and H, the thinned hydrolyzate of Runs A-D, F and I-K were initially treated with alpha amylase and gradually cooled while permitting the hydrolysis thereof to continue over a prolonged period of time (e.g., compare the time-temperature curves of Runs A-D, F and I-K with Runs G and H of FIG. II).

In comparison to Runs G and H, the conversion syrup of Run E exhibited a much faster rate of filterability. The rate of filterability for the conversion syrup from Run E was significantly less than those of Runs A-D, F and I-K. The amount of insolubles for Run E was also significantly greater than that of Runs A-D, F and I-K (e.g., compare the residue volume percent in the table). When submitted to the iodine test for starch, the conversion syrup of Run E was brown to red. A principal reason Run E failed to provide a high degree of filterability was due to inactivation of the alpha amylase during the first step of thinning the starch hydrolyzate. Deactivation of the alpha amylase could have been corrected either by reducing the thermal conditions or increasing the amount of alpha amylase used.

In Run F, the amount of alpha amylase used to thin the hydrolyzate was substantially greater than the other runs used in preparing conversion syrups of high filterability. The hydrolyzate of Run F differed somewhat from these runs in that the hydrolyzate medium was cooled more rapidly and conducted for a shorter period of time at lower temperature to achieve the desired thinned hydrolyzate. The conversion syrup of Run F was substantially free from retrograded starch and starch insolubles (e.g., granule starch) as were Runs A-D and I-K. Unlike Runs G and H (which contained a substantial amount of starch solubles), the thinned hydrolyzate of Run F was prepared under gradual and incremental decreases in temperature as opposed to the rapid temperature decrease of Runs G and H.

It will be observed from the temperature curves for Runs B–D and K that the appropriate hydrolyzate thinning steps provide a means for substantially reducing the alpha amylase requirements necessary to provide the desired thinned hydrolyzate. Run C is illustrative of excellent thinning conditions while maintaining the alpha amylase at a relatively low level. In Run C, the alpha amylase requirements could have been reduced substantially below 15 units while still deterring the formation of retrograded starch.

The thinned hydrolyzate prepared by the present invention should be substantially free from starch when submitted to the standard iodine tests. Conversion syrups prepared from thinned hydrolyzate which exhibit a purple or blue color inherently possess a poor rate of filterability. The rate of filterability of conversion syrups prepared from thinned hydrolyzates of a red or brown color (preferably at least brown) are siginfiicantly greater than those of a blue or purple color. Thinned hydrolyzates which evince a yellow starch iodine test color provide conversion syrups of unexpectedly superior filtration characteristics.

EXAMPLE III

Corn Starch-Gluten Separation

An 18° Baumé starch slurry (pH 4.5) containing less than 0.05% by weight water soluble protein (e.g., percent soluble protein at 40° C. and pH 4.5) and a corn protein assay of 17% by dry solid weight with the remaining dry solids therein consisting essentially of unmodified corn starch granules was obtained from a corn wet milling stream. The starch slurry was pumped through a steam injection heater maintained at 306° F. and 56 p.s.i. (absolute), and retained in the tail pipe section for about 19 minutes at approximately 306° F. and 56 p.s.i. Immediately prior to the flash cooling to a temperature of 207° F., the partial hydrolyzate was neutralized with 3 M calcium hydroxide to a pH 5.8. The resultant partial hydrolyzate on a carbohydrate dry substance basis had a D.E. of less than 0.5. The flashed cooled, partial hydrolyzate was then initially treated with 37 units of alpha amylase per 100 grams of hydrolyzate solids. Within a three minute time interval, the partial hydrolyzate was allowed to cool to 201° F. The hydrolyzate medium was allowed to further cool to a temperature of 198° F. and 192° F., respectively at 5 and 12 minutes after the initial treatment with alpha amylase. After continuing the hydrolysis thereof for 72 minutes at 190° F., the desired thinned hydrolyzate was obtained. The thinned hydrolyzate had a D.E. of about 16 with samples thereof giving a negative test when subjected to the standard iodine starch test (i.e., yellow color). As mentioned in Example II, thinned hydrolyzates indicating a red or brown starch iodine test may be utilized. A blue or purple starch iodine test indicates the presence of a substantial amount of insoluble starch which in turn adversely affects the filterability thereof.

The thinned hydrolyzate was immediately filtered through a conventional filter medium. It was observed that the thinned hydrolyzate containing insoluble proteins filtered very rapidly. The recovered insoluble protein (i.e., corn gluten) was analyzed and found to be of food grade. The recovered protein product possessed substantially the same chemical and physical characteristics as the insoluble protein of the wet milling stream initially subjected to the thinning and recovery process of this example. The recovered protein product was not degraded and possessed substantially the same viscosity as the insoluble corn gluten portion of the wet milling stream. The yield of recovered protein was substantially identical to the percent protein insolubles within the original wet milling stream.

The filtrate pH (the insolubles removed therefrom) was then adjusted to the optimum pH for enzymolysis with glucoamylase and saccharified to a dextrose conversion syrup in a manner similar to Example 1. The saccharification thereof and characteristics of the resultant conversion were similar to the results of Example 1.

EXAMPLE IV

Several products, commonly known to the art as "maltodextrins," were prepared in accordance with the apparatus and methodology of Example I. The aqueous slurry employed in preparing the maltodextrin product was characterized as containing on a weight basis 1,500 parts starch solids, 2,300 parts water and 0.5 part calcium diorthophosphate with the pH of the slurry being adjusted to 3.9 via 3 N hydrochloric acid. Sixty-five p.s.i. stream pressure was employed in the steam injection and holding zones. The starch paste emitted from the holding zone was flash cooled to about 212° F. and neutralized with 1.1 parts by weight calcium hydroxide. The neutralized starch paste was then initially treated with 25.0 units of alpha amylase per 100 grams of dry starch solids.

After initiating the enzyme hydrolysis, the alpha amplase treated paste was gradually cooled under controlled conditions with the resultant hydrolyzate having recorded temperatures of about 196° F., 191° F., 190° F., and 189° F., respectively, at 11, 14, 16 and 25 minutes. The hydrolyzate was then maintained at 189° F. for 135 minutes following initial alpha amylase treatment. An aliquot portion of the hydrolyzate was then withdrawn from the hydrolyzate medium. The withdrawn portion (hereinafter referred to as "Sample 1") was heated to 208° F. for a period of time sufficient to inactive the alpha amylase therein. Thereafter Sample 1 was adjusted to pH 4.0 with 3 N hydrochloric acid and filtered.

The remaining hydrolyzate medium was maintained at 189° F. and treated with an additional 5.7 units alpha amylase for each 100 grams of starch hydrolyzate solids at 180 and 390 minutes after initial alpha amylase treatment. Samples 2 and 3 were respectively withdrawn from the hydrolyzate medium and treated similar to Sample 1.

Illustartive maltodextrins characteristics of Samples 1–3 are:

|  | Sample | | |
| --- | --- | --- | --- |
|  | 1 | 2 | 3 |
| D. E. | 13.0 | 14.7 | 17.8 |
| Saccharides content: |  |  |  |
| D.P.$_1$ | 0.5 | 0.5 | 0.7 |
| D.P.$_2$ | 2.4 | 3.6 | 4.6 |
| D.P.$_3$ | 4.0 | 6.6 | 7.6 |
| D.P.$_4$ | 1.6 | 1.9 | 2.9 |
| D.P.$_5$ | 4.0 | 4.0 | 4.2 |
| D.P.$_6$ or higher | 87.7 | 83.4 | 81.0 |

Al lsamples exhibited excellent filtration and maltodextrin properties. As evidenced by the tabulated data, hydrolyzates of a predetermined D.E. (e.g., those of a D.E. of less than 30) and high oligosaccharide content (e.g., containing oligosaccharide of D.P. six or more as a major constituent on a dry weight basis) can be readily obtained by using the appropriate temperature, hydrolyzing time and alpha amylase requirements. The methodology of this example is particularly useful in preparing maltodextrins having a D.E. of about 10 to about 22 and which contain at least 75% by weight oligosaccharide (dry solids) of a D.P. six or more. Similar to the results reported hereinbefore, the preparation of the desired low D.E. hydrolyzates necessitated a significantly lesser amount of alpha amylase than normally required by conventional processes.

Since many embodiments of this invention may be made and since many changes may be made in the embodiments described, the foregoing is to be interpreted as illustrative only and the invention is defined by the claims appended hereafter.

What is claimed is:

1. A method of enzymatically thinning starch hydrolyzates under decreasing temperature and processing conditions sufficient to provide a thinned hydrolyzate substantially free from retrograded starch and granular starch wherein less than about 40 units of alpha amylase for each 100 grams of starch hydrolyzate solids is utilized to prepare the thinned hydrolyzate, said method comprising the steps of:
   (a) partially hydrolyzing an aqueous starch slurry maintained at a pH of about 3.6 to 5.0 by heating the slurry under superatmospheric conditions to a temperature of at least 250° F. for a period of time and under conditions sufficient to provide a partial starch hydrolyzate characterized as essentially free from insouble starch granules and a D.E. of less than 2.0,
   (b) further hydrolyzing the partial starch hydrolyzate by initially treating the partial hydrolyzate with alpha amylase in an amount sufficient to hydrolyze the partial hydrolyzate and allowing the hydrolysis thereof to proceed while maintaining the hydrolyzate at a temperature of at least 200° F. for a period of time of about a half a minute or longer, and
   (c) preparing a thinned hydrolyzate by cooling the hydrolyzate to a temperature within the range of at least 185° F. to less than 200° F. and allowing the alpha amylase to continue to hydrolyze the hydrolyzate to a D.E. value of greater than about 5 and the thinned hydrolyzate thereof is characterized as providing neither a blue or purple color when subjected to the starch iodine test.

2. The method according to claim 1 wherein at least a major portion of the total alpha amylase requirements for preparing the thinned hydrolyzate is initially added to the partial hydrolyzate within the temperature range of at least 200° F. to about 212° F.

3. The method according to claim 2 wherein the aqueous starch slurry contains at least 20% by weight starch solids and the total amount of alpha amylase added during steps (b) and (c) ranges from about 5 to 40 units per 100 grams of dry starch hydrolyzate solids.

4. The method according to claim 1, wherein the aqueous starch slurry contains from 5% to about 50% by weight dry starch solids, the partial hydrolyzate of step (a) is characterized as having a viscosity ranging from about 200 cps. and less than 3,000 cps. and the partial hydrolyzate is initially treated and hydrolyzed at a temperature of at least 200° F. to about 212° F. for a period of time ranging from about 0.5 to about 25 minutes and the amount of alpha amylase added to prepare the thinned hydrolyzate is less than about 30 units for each 100 grams of starch hydrolyzate solids.

5. The method according to claim 4 wherein the total molar concentration of alkaline earth metal and alkali metal in the aqueous starch slurry subjected to partial hydrolysis is less than 0.003 M.

6. The method according to claim 5 wherein the aqueous starch slurry is injected into a steam injection heater operated at temperatures and pressures respectively ranging from about 290° F. to about 325° F. and from about 57 p.s.i. to about 96 p.s.i. (absolute) and at least a major portion of the total alpha amylase requirements are initially added to the partial hydrolyzate within a temperature range of at least 200° F. to about 212° F.

7. The method according to claim 6 wherein immediately following treatment of the aqueous starch slurry in the steam injection heater the gelatinized slurry is retained in a retention zone maintained at a temperature of at least 250° F. under superatmospheric conditions for a period of time ranging from about 1 to about 20 minutes and the partial hydrolyzate is characterized as having a viscosity of less than 1,500 cps. and a D.E. of less than 1.0.

8. The method according to claim 1 wherein the aqueous starch slurry is subjected to a temperature of at least 250° F. under super-atmospheric conditions for a period of time sufficient to provide a partial hydrolyzate characterized as having a viscosity of less than 1,500 cps. and a D.E. of less than 1.0.

9. The method according to claim 8 wherein the aqueous starch slurry has a pH ranging from about 4.0 to about 5.0 and the aqueous slurry contains from about 30% to about 40% by weight corn starch solids.

10. The method according to claim 8 wherein prior to initial treatment of the partial hydrolyzate with alpha amylase the pH of the partial hydrolyzate is adjusted to within the range of about 5.8 to about 8.5 and then hydrolyzed to a thinned hydrolyzate with less than about 30 units alpha amylase for each 100 grams of starch hydrolyzate solids.

11. The method according to claim 2 wherein the partial hydrolyzate is characterized as having a viscosity of less than 1,500 cps., and after initially treating the partial hydrolyzate with alpha amylase within the 200 to 212° F. temperature range, the hydrolysis is accomplished by incrementally decreasing the thinning temperature over a period of time sufficient such that the resultant starch hydrolyzate has a D.E. greater than 5.0 and the thinned hydrolyzate neither provides a blue or purple when subjected to the starch iodine test.

12. The method according to claim 11 wherein the thinned hydrolyzate is characterized as having a yellow color when subjected to the standard iodine test and the partial hydrolyzate is characterized as having a D.E. and viscosity respectively less than 0.5 and less than about 1,000 cps.

13. The method according to claim 12 wherein at least 75% of the total alpha amylase requirements is added to partial hydrolyzate within the temperature range of at least 200° F. to about 212° F.

14. The method according to claim 13 wherein the thinned hydrolyzate is saccharified with a glucoamylase preparation to a dextrose content ranging from about 94 to about 96% by weight solids.

15. The method according to claim 4 wherein the thinned hydrolyzate is treated with a saccharifying enzyme preparation under saccharifying conditions sufficient to provide a conversion syrup having a F.E. of at least 35.

16. The method according to claim 15 wherein the saccharifying enzyme preparation is adapted to provide a conversion syrup containing on a weight basis maltose as the principal F. E. constituent and the saccharification thereof is allowed to continue under conditions sufficient to provide a conversion syrup containing maltose as the principal solid ingredient therein.

17. The method according to claim 16 wherein the resultant conversion syrup obtained thereby contains at least 23% by weight (on conversion syrup solids basis) maltose and less than 12% by weight dextrose.

18. The method according to claim 10 wherein the thinned hydrolyzate is treated with a glucoamylase preparation and the thinned hydrolyzate is converted to a syrup having a dextrose content of at least 90% by solids weight.

19. The method according to claim 4 wherein after the initial treatment and hydrolysis of the partial hydrolyzate, the resultant hydrolyzate is subjected to an incremental decrease in thinning temperature within the range of at least 185° F. to less than 200° F. over a period of time sufficient to provide a thinned hydrolyzate characterized as substantially free from retrograded starch and starch granules as evidenced by the starch iodine test.

20. The method according to claim 19 wherein the hydrolysis is conducted within the temperature range of 190° F. to 200° F. for a period of time of at least 15 minutes.

21. The method according to claim 20 wherein the partial hydrolyzate is characterized as having a D.E. of less than 1.0 and a viscosity ranging from about 400 cps.

to about 900 cps., the aqueous starch slurry contains from about 30 to about 40% by weight corn starch solids with the amount of alpha amylase being 15 units or less for each 100 grams of dry starch hydrolyzate solids and the thinned hydrolyzate maintains a yellow color when subjected to the starch iodine test.

22. The method according to claim 21 wherein substantially all of the apha amylase requirements necessary to thin the partial hydrolyzate are added to the partial hydrolyzate within the temperature range of at least 200° F. to about 212° F.

23. The method according to claim 2 wherein the partial hydralyzate has a D.E. of less than 0.5 and a viscosity of less than 1,000 cps. with the hydrolysis being conducted under incremental decreases in temperature for a period of time sufficient to provide a thinned hydrolyzate characterized as indicating a yellow color when subjected to the starch iodine test.

24. The method according to claim 23 wherein the aqueous starch slurry is characterized as having a total molar concentration of alkaline earth metal and alkali metal of less than .003 M, a pH of about 3.5 to about 4.5, and about 25 to about 40% by weight corn starch solids.

25. The method according to claim 24 wherein the hydrolysis thereof is subjected to average incremental decreases in temperature of less than 2° F. per minute within the temperature range of 190° F. to 212° F.

26. The method according to claim 15 wherein the aqueuos starch slurry contains from about 0.5% to about 20% by weight insoluble protein solids and the insoluble protein solids are partitioned from the conversion syrup after the saccharification thereof.

27. The method according to claim 12 wherein the aqueous starch slurry contains from about 0.5% to about 20% by weight insoluble protein and the insoluble protein solids are partitioned from the thinned hydrolyzate.

28. The method according to claim 1 wherein the hydrolysis with the alpha amylase is allowed to continue for a period of time and under conditions sufficient to provide a hydrolyzate characterized as having a D.E. ranging from about 8 to about 30 with the hydrolyzate containing as a major dry solids constituent (on a weight basis) polysaccharides of at least six saccharide units.

29. The method according to claim 28 wherein the resultant hydrolyzate is characterized as having a D.E. of about 10 to about 22 with at least 75% by weight of the dry hydrolyzate solids being comprised of polysaccharide of at least six saccharide units.

References Cited
UNITED STATES PATENTS 3,654,081    4/1972    Vance et al.    195—31 R
3,644,126    2/1972    Bodnar et al.    195—31 R A. LOUIS MONACELL, Primary Examiner T. G. WISEMAN, Assistant Examiner U.S. Cl. X.R.

195—7, 11

UNITED STATES PATENT OFFICE
CERTIFICATE OF CORRECTION

Patent No. 3,783,100            Dated January 1, 1974

Inventor(s) Roy F. Larson and Almerin W. Turner

It is certified that error appears in the above-identified patent and that said Letters Patent are hereby corrected as shown below:

Column 1, line 14; for "200°C-212°F." read ---200°F.-212°F.---.
Column 2, line 58; for "thinner" read ---thinned---.
Column 4, line 62; for "50)" read ---50%)---.
Column 7, line 5; for "pretreament" read ---pretreatment---.
Column 7, line 57; for "hydrolyzates" read ---hydrolyzate---.
Column 8, line 40; for "clarase" read ---Clarase---.
Column 9, line 23; for "normaly" read ---normally---.
Column 10, line 67; for "ar" read ---are---.
Column 11, line 6; for "glycoamylase" read ---glucoamylase---.
Column 11, line 7; for "amyloglycosidase" read ---amyloglucosidase---.
Column 12, line 39; for "starchlgluten" read ---starch-gluten---.
Column 13, line 22; for "partioned" read ---partitioned---.
Column 14, line 28; for "Theh" read ---The---.
Column 16, line 20; for "fro" read ---for---.
In the Table bridging columns 17 and 18; for "Neutralization" read ---Neutralization$^3$---.
Column 20, line 15; for "stream" read ---steam---.
Column 20, line 23; for "amplase" read ---amylase---.
Column 20, line 42; for "Illustartive" read ---Illustrative---.
Column 20, line 55; for "Al lsamples" read ---All samples---.
Column 21, line 16; for "insouble" read ---insoluble---.
Column 23, line 8; for "apha" read ---alpha---.

Signed and sealed this 5th day of November 1974.

(SEAL)
Attest:

McCOY M. GIBSON JR.            C. MARSHALL DANN
Attesting Officer               Commissioner of Patents